Patented May 9, 1939

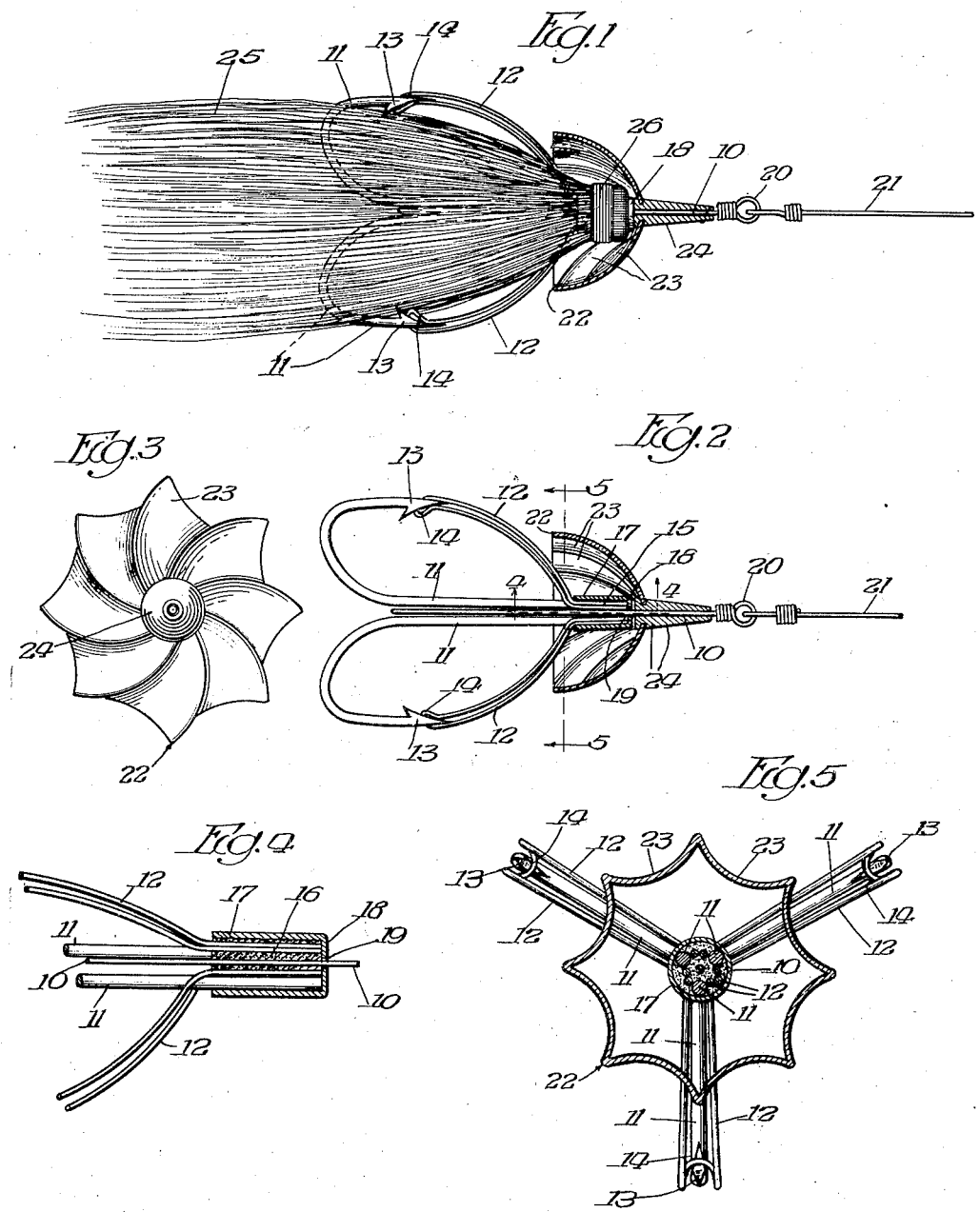

2,157,414

UNITED STATES PATENT OFFICE 2,157,414

ARTIFICIAL FISHING BAIT

Carl A. Johnson, Chicago, Ill.

Application December 4, 1937, Serial No. 178,042

2 Claims. (Cl. 43—39)

This invention relates to improvements in artificial fishing bait and one of the objects of the same is to provide an improved bait of this type which will not only be provided with an improved spinner but there is also provided a guard for the hook to prevent it from catching into and gathering weeds as the bait is drawn through the water, the spinner itself being provided with means for guiding it and the bait through the grass or weeds.

The construction of the bait is such that the tendency of the hook to rotate as it is being drawn through the water will be prevented by the spinner, the latter being in the form of a hood or shield for the hook, and will itself rotate while the hook will be maintained against rotation and the line against twisting.

To the attainment of these ends and the accomplishment of other new and useful objects as will appear, the invention consists in the feature of novelty in substantially the construction, combination and arrangement of the several parts hereinafter more fully described and claimed and shown in the accompanying drawing illustrating this invention, and in which Figure 1 is a view partly in elevation and partly in section of a bait of this character constructed in accordance with the principles of this invention.

Figure 2 is a longitudinal sectional view with parts omitted.

Figure 3 is a top plan view of the spinner element.

Figure 4 is a detail sectional view taken on line 4—4 Figure 2, on an enlarged scale, and with parts omitted.

Figure 5 is a transverse sectional view, on an enlarged scale, taken on line 5—5 Figure 2.

Referring more particularly to the drawing, the numeral 10 designates a rod or wire to which a plurality of hooks 11 are secured by one end. This rod may be constructed of any suitable material and of any desired length and may be secured to the hooks in any suitable manner.

The numeral 12 designates guards for the barbed end 13 of the hooks. These guards 12 are constructed of any suitable material and are flexible and resilient being preferably formed into the shape of a loop, the connecting portion 14 of which is preferably shaped to form a seat, the wall of which rests against the barbed end. The ends of the guards 15 may be anchored or secured in any desired or suitable manner and are preferably disposed adjacent the end of the body of the hook, rod or wire 10, and the ends of the guard are secured in any suitable manner such as by soldering, brazing, welding or in any suitable manner as at 16.

A cap or ferrule 17 having a closed end 18 is placed over the anchored ends of the hook and the guard and is secured in any suitable manner. This ferrule is provided with an opening 19 through which the wire 10 passes.

The end of the wire is preferably formed into an eye or loop 20 to which the line 21 is connected in any suitable manner.

The numeral 22 designates a spinner which is preferably of a semicircular or dome shaped configuration and is hollow, being constructed of any desired or suitable material and the body portion thereof is shaped to form spiral convolutions 23 which extend in general directions lengthwise of the axis of the spinner. Secured to the spinner in any suitable manner is a conical or tapering projection 24 which is provided with a passage therethrough arranged, when the spinner is assembled with respect to the hook, in alinement with the opening 19 in the ferrule 17 so that the rod or wire 10 will pass therethrough and the spinner together with the tapering or conical projection 24 will rotate freely about the rod or wire.

When the spinner is assembled it rests at its apex upon the closed end 18 of the ferrule 17 and the tapering extension 24 is of such a length that its extremity will terminate in close proximity to the eye 20 so that in cooperation with the end 18 of the ferrule 17 and the eye 20 the spinner will be held substantially against movement lengthwise of the rod or wire 10.

A tail or feather portion 25 substantially conceals the hooks and is secured in position in any suitable manner preferably by one extremity thereof being fastened or anchored as at 26 to the hook or to the ferrule 17.

The spinner 22 is of such a diameter that it will extend over the anchored end of the hooks and the tail member 25 as well as the ferrule 17, and during the advancement of the spinner through the water it will rest upon the closed end 18 of the ferrule 17 as a bearing, the water operating to cause the spinner to freely rotate about the rod or wire 10.

During this advancement of the bait through the water, the tendency of the hooks 11 to rotate and of the line 21 to twist will be overcome by the rotation of the spinner, the spinner forming a shield or guard to direct the water as well as the weeds through which it passes, away from the hooks.

The extension 24 on the spinner also serves to assist in guiding and directing the spinner through the weeds.

While the preferred form of the invention has been herein shown and described, it is to be understood that various changes may be made in the details of construction in the combination and arrangement of the several parts, within the scope of the claims, without departing from the spirit of this invention.

What is claimed as new is:

1. An artificial bait embodying a wire rod, a hook provided adjacent one end of the rod, an anchored guard yieldably contacting the hook adjacent the end of the latter, a tail element substantially concealing the hook, a concaved spinner mounted upon said rod for free rotation with respect thereto and extending over the proximate portions of the hook and tail, means for maintaining the spinner against movement in a direction lengthwise of the rod, the body of the spinner being formed into spiral convolutions extending in a direction lengthwise of its axis, and a tubular conical projection of substantial length rigidly connected with and projecting from the outer face of said spinner, said projection loosely encompassing said rod.

2. An artificial bait embodying a wire rod, a hook provided adjacent one end of the rod, a tail element substantially concealing the hook, a concaved spinner mounted upon said rod for free rotation with respect thereto and extending over the proximate portions of the hook and tail, means for maintaining the spinner against movement in a direction lengthwise of the rod, the body of the spinner being formed into spiral convolutions extending in a direction lengthwise of its axis, and a tubular conical projection of substantial length rigidly connected at its base with the spinner and projecting beyond the outer face of the latter, and loosely encompassing the rod to turn thereabout with the spinner, the base of said projection being of a diameter considerably less than the diameter of the spinner.

CARL A. JOHNSON.